Dec. 24, 1968   J. KONIJNENBERG ET AL   3,418,551
ASSEMBLY OF A DRY-SHAVING APPARATUS WITH BUILT-IN POWER SUPPLY
Filed June 29, 1966

INVENTORS
JOHAN KONIJNENBERG
BERNARDUS M. SPRADO
BY
AGENT

United States Patent Office 3,418,551
Patented Dec. 24, 1968

3,418,551
ASSEMBLY OF A DRY-SHAVING APPARATUS
WITH BUILT-IN POWER SUPPLY
Johan Konijnenberg and Bernardus Martinus Sparado,
Drachten, Netherlands, assignors to North American
Philips Company, Inc., New York, N.Y., a corporation
of Delaware
Filed June 29, 1966, Ser. No. 561,634
Claims priority, application Netherlands, July 17, 1965,
6509286
3 Claims. (Cl. 320—2)

ABSTRACT OF THE DISCLOSURE

A dry shaver including an electric motor and a built-in power supply using rechargeable batteries has a unitary frame assembly on which are mounted the motor, batteries, printed circuit and associated components. A housing having an outer surface to be gripped by a user, has an elongated interior chamber into which the frame assembly and components thereon are inserted and secured. Power supply components on the frame assembly are readily accessible for testing when outside the housing.

---

The invention relates to an electrical domestic apparatus, preferably a dry-shaving apparatus, with built-in power supply.

Such apparatus are known. Especially in the field of mechanization in mass production the known construction provides difficulty. The cost lowering influence of mass production increases when the manufacturing operations to be performed can be mechanized in a simple manner.

A readily mechanizable construction is achieved by accommodating supply and driving members in a holder, the whole being secured to the cap of a bipartite envelope.

The cap and the holder are secured to one another in such a simple manner that this part of the assembly can satisfactorily be mechanized.

The arrangement of electrical components in the holder can also be limited to a simple mechanizable operation owing to the shape of the holder.

This is achieved in that the holder includes a battery holder which accommodates the supply members, which consist of two cylindrical accumulators, and is provided with a flange which the driving member constituted by a motor engages in transverse direction.

The invention will now be described more fully with reference to the accompanying drawing, from which description further details will become evident.

Figure 1:
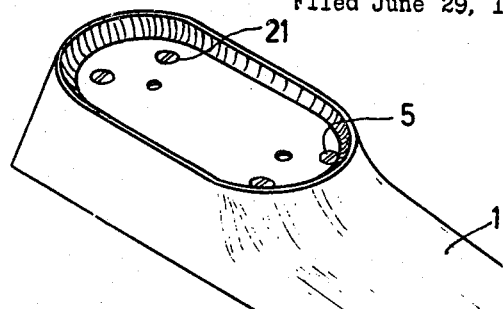
Figure 2:
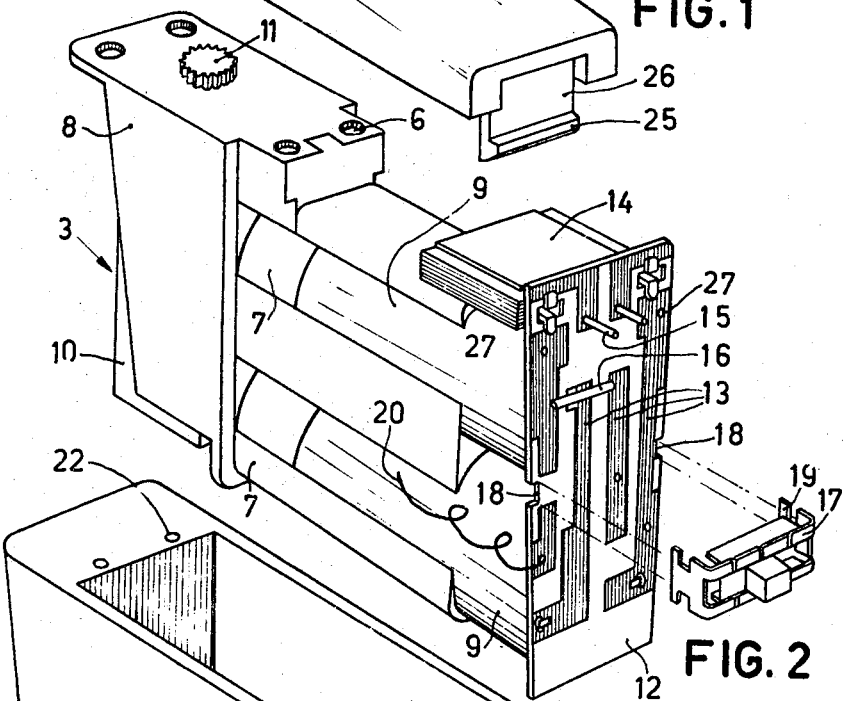
Figure 3:
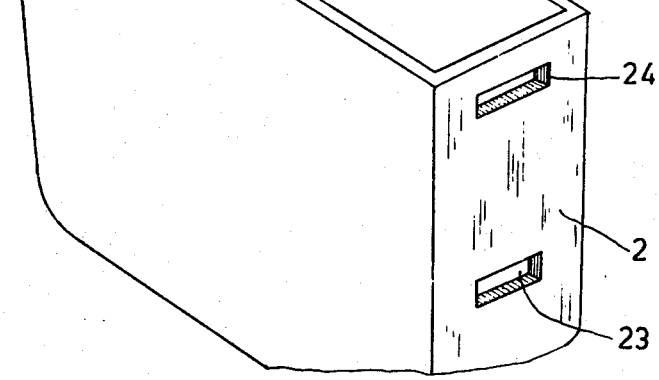

FIG. 1 is a perspective view of the envelope.
FIG. 2 is a perspective view of the holder with accumulators partly inserted into the battery holder.
FIG. 3 is a perspective view of the housing of the envelope.

The envelope of the dry-shaving apparatus consists of two parts, that is to say a cap 1 and a housing 2. A holder 3 for electrical components can be secured to the cap in a simple manner by means of screws 5 fitting into screwed holes 6 of the holder 3. The holder 3 consists of a battery holder 7 and a flange 8 made in one piece.

The supply members consisting of two cylindrical accumulators 9 can be inserted in a simple manner into the battery holder 7. (Cf. FIG. 2, in which these accumulators 9 are partly inserted into this battery holder 7.)

The holder 3 is provided with a flange 8 which is integral with the battery holder 7. The driving member consisting of a motor 10 with a gear-wheel 11 is enclosed by the flange 8 and engages the battery holder 7 in transverse direction.

The holder 3 thus formed is an excellent expedient for mounting electrical components, which moreover are readily accessible owing to the method of mounting, while this holder 3 together with the said components constitutes a mounting unit suitable for production to be mechanised either as a whole or in parts.

The upper ends of the accumulators 9 are secured to the non-printed surface of a mounting plate 12 provided with surface wiring, for example, a printed circuit 13. The non-printed surface of the mounting plate 12 is also provided with a rectifier 14. The conductive parts of the accumulators 9 and the rectifier 14 are conductively connected to the circuit through apertures in the mounting plate 12.

The printed surface of the mounting plate 12 is provided with plug pins 15 for connection to an external power source, a charging resistor 16 and a switch 17. The accumulators 9, the rectifier 14, the plug pins 15 and the charging resistor 16 are conductively connected to the circuit 13 by soldering, whilst the plug pins 15 are moreover flanged to the plate 12.

The mounting plate 12 is provided with recesses 18 in which lugs 19 of the slide switch 17 can be secured, the switch controlling the circuit whereby the batteries discharge when the motor is operated, or the batteries are recharged from said external power source.

The holder 3 with electrical components and the mounting plate 12 with the components secured thereto form again a mounting unit that can be readily mechanized both as a whole and in parts and is particularly suitable for mass production.

The brushes (not shown in the drawing) are connected through wires 20 to the circuit 13 of the mounting plate.

The serviceability of the parts of the aforementioned mounting unit can be tested with the aid of the circuit 13 and suitable testing apparatus, so that quality control is considerably facilitated.

The cap 1 and the holder 3 are then secured to the housing 2 with the aid of screws 21 fitting into screwed holes 22. This housing is further provided with an aperture 23 to accommodate the switch 17 and with an aperture 24 to accommodate the catch 25 of the lug 26. The catch 25 fits into the aperture 24.

The mounting plate 12 is further provided with two centering apertures 27 into which fit protuberances of the battery holder 7 (not shown in the drawing).

What is claimed is:
1. An electrical apparatus such as a dry shaver including an electric motor and a built-in power supply using rechargeable batteries, comprising:
   (a) a unitary frame assembly on which are mounted said motor and power supply;
   (b) a housing having an outer surface by which the apparatus may be gripped by a user and an elongated interior chamber; and
   (c) a cap to which the frame assembly is attached, the frame assembly being insertable into said chamber and the cap subsequently securable to the housing;
   (d) the frame comprising:
      (1) a body part carrying said drive mechanism,
      (2) at least two support members, each having one end secured to said body part, a central part extending transverse to said body, and a remote end, each pair of support members being in generally parallel, spaced relationship for receiving and supporting between them a battery, and
      (3) a plate secured to said remote ends, the side thereof remote from the body part including wiring of the power supply, whereby said wiring and power supply components are readily accessible for testing for quality control when the frame is removed from the housing.

2. Apparatus as defined in claim 1 further comprising the electric circuit components, a rectifier, a charging resistor, plug pins, and a switch secured to said plate and connected to said wiring thereon, whereby the switch controls the circuit for either recharging the batteries or discharging the batteries to operate the motor.

3. Apparatus as defined in claim 2 wherein the axis of the motor and the elongated housing axis are generally parallel, and are generally normal to the axis of said batteries.

References Cited

UNITED STATES PATENTS

| | | | |
|---|---|---|---|
| 2,963,598 | 12/1960 | Kent | 310—50 |
| 3,035,191 | 5/1962 | Kent | 310—50 |
| 3,101,537 | 8/1963 | Kleinman | 30—43.92 |
| 3,121,286 | 2/1964 | Schneiderman | 30—34 |
| 3,320,508 | 5/1967 | Bradshaw et al. | 320—2 |
| 3,137,815 | 6/1964 | Hershey | 324—158 |
| 3,311,763 | 3/1967 | Jepson et al. | 320—2 X |
| 3,339,276 | 9/1967 | Tolmie et al. | 30—34.1 |

JOHN F. COUCH, *Primary Examiner.*

STANLEY WEINBERG, *Assistant Examiner.*

U.S. Cl. X.R.

30—43.6; 310—47

UNITED STATES PATENT OFFICE
CERTIFICATE OF CORRECTION

Patent No. 3,418,551 December 24, 1968

Johan Konijnenberg et al.

It is certified that error appears in the above identified patent and that said Letters Patent are hereby corrected as shown below:

In the heading to the printed specification, line 4, "Sparado" should read -- Sprado --.

Signed and sealed this 31st day of March 1970.

(SEAL)
Attest:

Edward M. Fletcher, Jr.
Attesting Officer

WILLIAM E. SCHUYLER, JR.
Commissioner of Patents